United States Patent [19]

Nakagoshi et al.

[11] Patent Number: 5,799,252
[45] Date of Patent: Aug. 25, 1998

[54] RADIO COMMUNICATION SYSTEM WITH PLURALITY OF WIRED LINES

[75] Inventors: Arata Nakagoshi, Tokyo; Takafumi Kojima, Yokohama, both of Japan

[73] Assignee: Hitachi, Ltd., Tokyo, Japan

[21] Appl. No.: 609,747

[22] Filed: Mar. 1, 1996

[30] Foreign Application Priority Data

Mar. 3, 1995 [JP] Japan .................... 7-043848

[51] Int. Cl.⁶ .................................... H04B 7/00
[52] U.S. Cl. ................ 455/524; 455/436; 455/561
[58] Field of Search ..................... 455/422, 424, 455/445, 450, 507, 517, 524, 525, 523, 561, 432, 436, 63; 370/328, 329, 438

[56] References Cited

U.S. PATENT DOCUMENTS

| | | |
|---|---|---|
| 3,916,311 | 10/1975 | Martin et al. ............. 455/523 |
| 4,686,671 | 8/1987 | Burian et al. |
| 5,157,660 | 10/1992 | Kuwahara et al. |
| 5,212,806 | 5/1993 | Natarajan ................ 455/524 |
| 5,425,051 | 6/1995 | Mahany .................. 455/63 |

FOREIGN PATENT DOCUMENTS

| | | |
|---|---|---|
| 0479255 | 4/1992 | European Pat. Off. |
| 3-78332 | 4/1991 | Japan. |
| 9422245 | 9/1994 | WIPO. |

*Primary Examiner*—Nguyen Vo
*Attorney, Agent, or Firm*—Antonelli, Terry, Stout & Kraus, LLP

[57] ABSTRACT

A radio communication system including a network connecting apparatus for establishing communication between a mobile subscriber terminal and another subscriber terminal and a plurality of radio base stations. At least one wired communication line connects the network connecting apparatus to the plurality of radio base stations, and further control signal communication is enabled at least between the plurality of radio base stations and the network connecting apparatus. The radio communication system enables a wider service area with a smaller number of communication lines.

10 Claims, 6 Drawing Sheets

FIG. 7(a)

|  | COMMUNICATION CHANNEL 1 | COMMUNICATION CHANNEL 2 | COMMUNICATION CHANNEL 3 |
|---|---|---|---|
| BASE STATION A | RADIO CHANNEL 1 | — | — |
| BASE STATION B | — | — | — |
| BASE STATION C | — | — | — |

FIG. 7(b)

|  | COMMUNICATION CHANNEL 1 | COMMUNICATION CHANNEL 2 | COMMUNICATION CHANNEL 3 |
|---|---|---|---|
| BASE STATION A | RADIO CHANNEL 1 | — | — |
| BASE STATION B | — | — | — |
| BASE STATION C | — | — | RADIO CHANNEL 1 |

FIG. 7(c)

|  | COMMUNICATION CHANNEL 1 | COMMUNICATION CHANNEL 2 | COMMUNICATION CHANNEL 3 |
|---|---|---|---|
| BASE STATION A | RADIO CHANNEL 1 | — | — |
| BASE STATION B | — | — | — |
| BASE STATION C | — | RADIO CHANNEL 2 | RADIO CHANNEL 1 |

FIG. 7(d)

|  | COMMUNICATION CHANNEL 1 | COMMUNICATION CHANNEL 2 | COMMUNICATION CHANNEL 3 |
|---|---|---|---|
| BASE STATION A | — | — | — |
| BASE STATION B | RADIO CHANNEL 3 | — | RADIO CHANNEL 1 |
| BASE STATION C | — | RADIO CHANNEL 2 | — |

RADIO COMMUNICATION SYSTEM WITH PLURALITY OF WIRED LINES

The present invention relates to a mobile radio communication system and, more particularly to a radio communication system intended for application in services areas of comparatively lower communication traffic.

BACKGROUND OF THE INVENTION

An outline of a mobile communication system represented by a mobile telephone and a hand-held telephone is described in the "Mobile Communication" (edited by Masaaki Shinji, Maruzen) and "Digital Mobile Communication" (supervised by Moriji Kuwabara, Science Press). An example of a telephone-based mobile communication system is shown in FIG. 1. Connections are extended radially with communication lines 103A to 103C to a plurality of radio base stations 102A to 102C from a network connecting apparatus 101. Here, the communication lines 103A to 103C are generally set in such a number of lines as can be connected in each radio base station through a radio link. In FIG. 1, reference numerals 104A to 104C indicate radio zones of the radio base stations 102A to 102C. In city or urban areas, the communication traffic is comparatively higher, and respective radio base stations are allocated in a plane to form service areas. Therefore, the system shown in FIG. 1 is suitable for city areas.

Meanwhile, in a country or rural area where communication traffic is comparatively lower, a belt-shaped service area is formed, for example, along a road. Since a conventional radio equipment has provided a higher transmission output, a large zone system utilizing a higher output power has been employed in a low traffic area, but a small zone system utilizing a lower output power has been employed in a high traffic area. Recently, with spreading of hand-held radio terminals and reduction in size thereof, a transmitting output power of radio equipment tends to be lowered. A reduction in size of service area due to the drop of transmitting output power provides the effect that higher traffic can be accommodated through repeated use of radio channels.

However, when the system configuration shown in FIG. 1 is employed in a low traffic area using a radio terminal of low output power, many radio base stations and communication lines must be arranged in comparison with traffic. Moreover, with reduction in size of the service area, there arises a problem that hand-over between radio base stations occurs more often in time due to the movement of radio terminal.

Regarding these problems, a system has been disclosed in the official gazette of the Japanese Patent Laid-Open No. Hei 3-78332 (1991). In this system, a plurality of the low output power cordless telephone sets are connected by a multi-drop system (one after another in series) to a pair of communication cables of a wired transfer multiplexing apparatus. This system surely has reduced the number of wirings in the wired section by the frequency multiplexing system, however relates to a face-to-face communication, apparatus which has extended the communication distance by connecting the radio equipment in the base station side one after another with respect to the radio terminals and radio base stations which are previously interrelated with each other with identification numbers.

Meanwhile, a radio communication system as an object of the present invention does not set up an interrelation between the radio base stations and radio terminals with intrinsic identification numbers, but rather provides N:M communication system having an established interrelationship with the system identification numbers. In such an N:M communication system where the interrelationship is set up with the system identification numbers, the multi-drop system cannot be realized only with the technology disclosed in the official gazette of the Japanese Patent Laid-Open No. HEI 3-78332 and therefore the system shown in FIG. 1 has been employed as explained previously.

SUMMARY OF THE INVENTION

It is therefore an object of the present invention to provide a system configuration which can effectively use communication lines and radio channels in a low traffic area and realize a smooth hand-over operation in an N:M radio communication system where an interrelationship is set up with system identification numbers.

The present invention is provides for connecting a network connecting apparatus to a plurality of radio base stations by relaying the available communication lines, with inclusion of a means provided in the network connecting apparatus or radio base station to collect and administer the information regarding radio channels which are now in use or ready for use in each radio base station and a means to communicate the information regarding the radio channel or control information based on the information regarding such radio channels between the network connecting apparatus and radio base stations and between the radio base stations.

According to one aspect of the present invention, control signal lines are provided for communication of control information between the network connecting apparatus and the radio base stations.

According to another aspect of the present invention, communication lines are used for communication of control information between the network connecting apparatus and a plurality of radio base stations.

According to the present invention, there is provided a radio communication system wherein when a call is newly originated in the radio communication system, a radio channel which is not used by a peripheral radio base station is assigned based on the information regarding the radio channels being used by the peripheral radio base station obtained through the control signal line from the other radio base stations or network connecting apparatus.

In accordance with the present invention, there is provided a radio communication system wherein as the information regarding the radio channels to be used by the radio base stations in the radio communication system, interrelationship between the names of the radio base stations, name of the communication lines being used and the radio channel numbers being used is set up and administered.

According to the present invention, there is provided a radio communication system wherein a means is provided for connecting the network connecting apparatus and a plurality of the radio base stations by sequentially relaying communication lines in the radio communication system to hold, when a communicating radio terminal changes a radio base station for continuation of the communication, a communication line selected when the communication line to the relevant radio terminal is connected and to change the radio base station only with change of the radio link.

In accordance with the present invention, there is provided a radio communication system wherein a means is provided for connecting the network connecting apparatus and a plurality of the radio base stations by sequentially relaying communication lines in the radio communication system to hold, when a communicating radio terminal changes a radio base station for continuation of the communication, a radio channel selected when the communication line to the relevant radio terminal is connected and to change the radio base station only with change of the radio link.

According to the present invention, there is provided a radio communication system wherein a means is provided for connecting the network connecting apparatus and a plurality of radio base stations by sequentially relaying communication lines in the radio communication system to define a group formed of a plurality of the radio base stations connected by sequential relay of communication lines or the group divided into a plurality of subgroups as a position registration area and a simultaneous calling area.

In accordance with the present invention, there is provided a radio communication system wherein the communication lines are connected between radio base stations corresponding to a radio terminal not by way of the network connecting apparatus on the occasion of connecting between radio terminals in the same position registration area and simultaneous calling area in the radio communication system.

According to the present invention, there is provided a radio communication system wherein a means is also provided in the radio communication system to report to the network connecting apparatus or to the other radio base stations in the same position registration area and simultaneous calling area that the communication lines are connected between the radio base stations corresponding to the radio terminals not by way of the network connecting apparatus in the same position registration area and simultaneous calling area.

In accordance with the present invention, there is provided a radio communication system wherein a means is additionally provided for amplifying a signal passing through the communication lines when the signal is relayed by the radio base stations in the radio communication system.

According to the present invention, if a transmitting output power of each radio base station is rather low, not only a wide service area can be obtained with a smaller number of radio links, but also the communication lines and radio channels in the system can be used effectively, assuring smooth and reliable hand-over due to the movement of a radio terminal by relaying the connections of the same communication line from the network connecting apparatus to a plurality of radio base stations and administrating the information regarding the radio channels.

For example, the hand-over occurring in an area configured by a plurality of radio base stations connected with the identical communication line is covered only with change of radio link while the communication line is fixed and thereby a load of the network connecting apparatus can be alleviated.

Moreover, a possibility for change of radio channels due to the change of radio link when the hand-over occurs may be lowered to realize reduction in amount of processing of the system as a whole and smooth hand-over by collecting and administering information regarding the radio channels and selecting the radio channels which may be used in the periphery of the radio base stations operating for connections of call and in all radio base stations in the group.

Moreover, distance of relayed connections of the communication lines can be extended by amplifying the signal passing through the connected communication lines in the radio base stations.

Here, the number of communication lines transmitted from the network connecting apparatus can be determined depending on the number of radio links of each radio base station and therefore the service area can be expanded in the low traffic area while the number of communication lines is suppressed. Even when a radio terminal under the communication moves between the radio base stations, change-over (hand-over) of the radio base station is executed without changing the communication line extended from the network connecting apparatus. In addition, the hand-over can also be executed while the radio channel is fixed by reserving the radio channel under the communication through information exchange regarding the radio channels used between the radio base stations.

These and other objects, features and advantages of the present invention will become more apparent from the following description when taken in conjunction with the accompanying drawings.

BRIEF DESCRIPTION OF THE DRAWINGS

FIGS. 7(a)-7(d) show an application map of communication lines and radio channels.

DETAILED DESCRIPTION OF THE PREFERRED EMBODIMENTS

Figure 2:
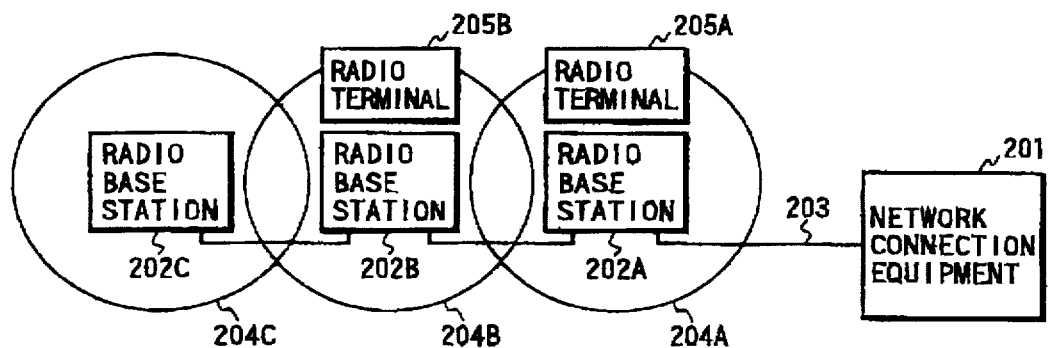
FIG. 2 is a system configuration diagram of an embodiment of the present invention.

Referring now to the drawings wherein like reference numerals are utilized to designate like parts, a first embodiment of the present invention is shown in FIG. 2.

A communication line 203 is connected between a network connecting apparatus 201 and radio base stations 202A to 202C. 204A to 204C are respectively radio zones of the radio base stations 202A to 202C. The number of lines of communication line 203 is set at the time of configuring a system. In FIG. 2, the number of lines=1 is set as the minimum unit. The radio terminal 205A in the radio zone 204A is connected with the network connecting apparatus using the communication line 203 through a radio base station 202A and is then connected with a communication terminal existing in the area inside or outside the group formed of the radio base stations 202A to 202C.

Figure 3:
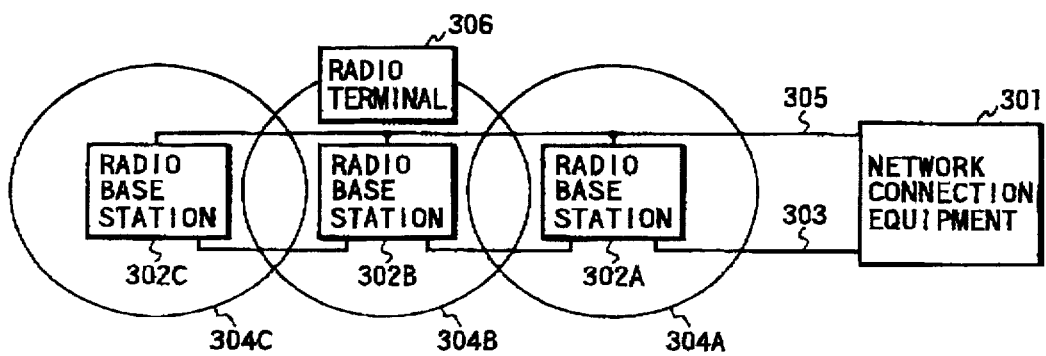
FIG. 3 is a system configuration diagram of a second embodiment of the present invention.
Figure 11:
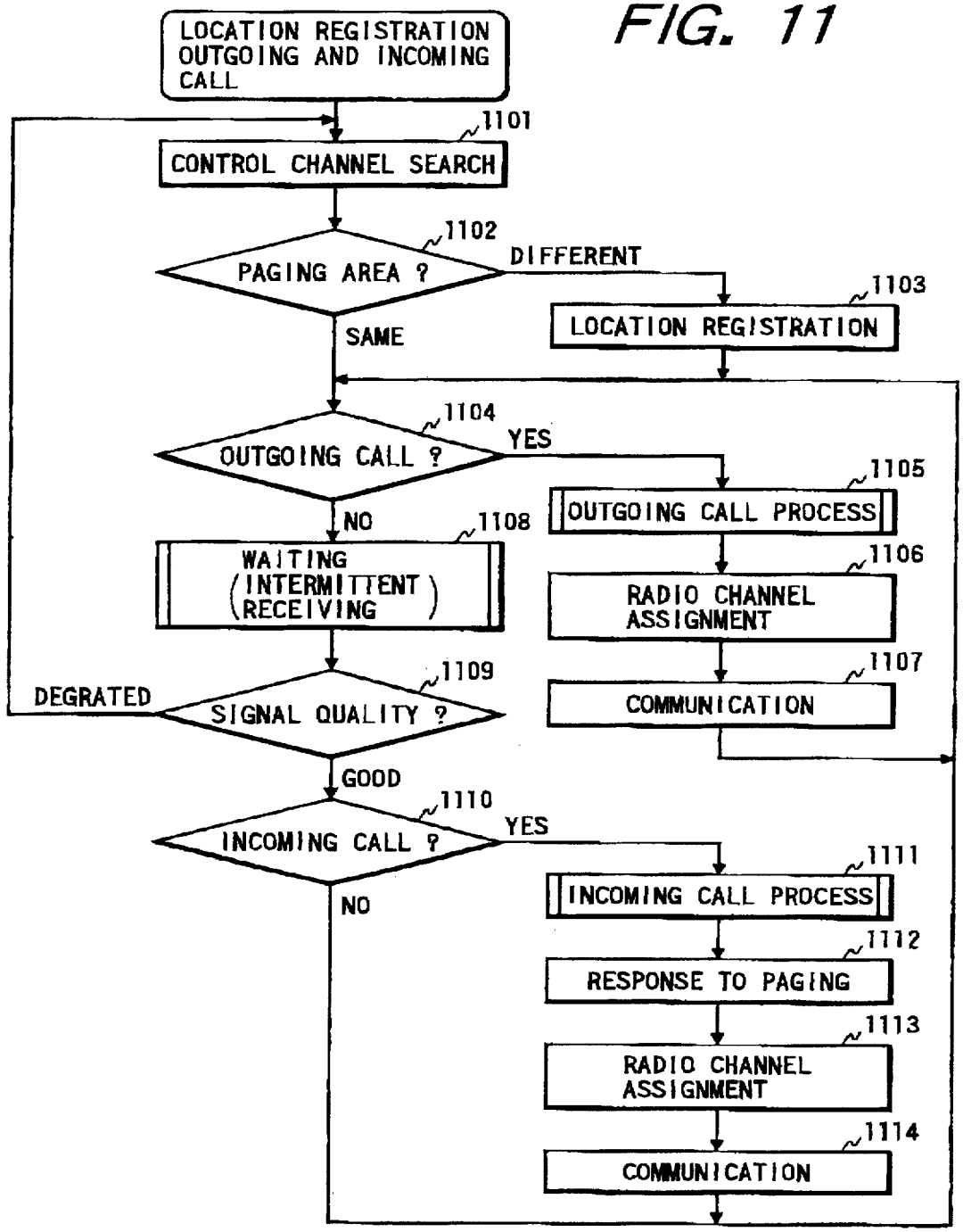
FIG. 11 is a flowchart of position registration/origination or termination of call based on the present invention.

In general, intercommunication of control information for system running is necessary between the radio base stations and network connecting apparatus. FIG. 3 shows an example of system configuration as a second embodiment of the present invention. In addition to the communication line 303 used for relayed connection between the network connecting apparatus 301 and the radio base stations 302A to 302C, a control signal line 305 is provided between the network connecting apparatus 301 and the radio base stations 302A to 302C. Hereinafter, explanation will be made with reference to the flowchart of FIG. 11 of the position registration operation and the call originating and terminating operations.

When a radio terminal 306 enters a radio zone 304B from outside of the service area, the radio terminal 306 captures (1101) a control channel transmitted from a radio base station 302B. When a different calling area is recognized upon judgment (1102) whether the calling area is already called or not, the radio terminal 306 registers its position (1103) through the radio base station 302B in preparation for termination of call from the other radio terminal. A position registration information is stored in the network connecting apparatus 301 or in a database provided separately from the radio base station 302B through the control signal line 305. The radio terminal 306 enters the waiting mode after its position is registered.

For the origination of call (1104) to an other terminal from the radio terminal 306, it starts the processing for origination of call from the waiting mode. Next, the radio terminal 306 issues a request for assignment of radio channel for communication through the control channel of the radio base station 302B already captured and the radio base station 302B assigns (1106) the communication radio channel for the radio terminal 306. Next, the information required for a series of call origination processing is exchanged between the radio terminal 306 and the radio base station 302B through the radio link using the assigned radio channel and between the radio base station 302B and the network connecting apparatus 301 through the control signal line 305. When the connecting operation with a distant terminal is completed, communication can be effected (1107) with the distant radio terminal through the communication line 303.

Meanwhile, when the radio terminal 306 is in the waiting mode for termination of call from the other terminals, an intermittent receiving operation (1108) is conducted generally to periodically receive the control channel of the radio base station 302B. When the terminal 306 is called after judgment (1110) whether a calling signal thereto is included or not in the received control channel, the radio terminal 306 starts the operation for termination of the call (1111). First, the radio terminal 306 sends the answer for termination of the call to the radio base station 302B. As in the case of the origination of the call, the radio base station 302B assigns the radio channel (1113) for the radio terminal 306. After the connecting operation to a distant terminal is completed by executing the operation for termination of the call through the control signal line 305, the radio terminal 306 effects communication (1114) with the distant terminal through the communication line 303.

The radio terminal 306 monitors (1109) the receiving quality of the control channel of the radio base station 302 while it is in the waiting condition. If the receiving quality is lowered due to the movement of the radio terminal 306, the radio terminal 306 captures again (1101) the control channel of the radio base station and renews the registration of position as required. Since the position registration and simultaneous calling area 307 is formed of the radio base stations 302A to 302C, only the radio base station as the receiving object changes during the waiting condition and renewal of the position registration is not required so long as the radio terminal 306 is moving within the radio zones 304A to 304C. That is, it is not required for the network connecting apparatus 301 to detect in which radio zone the radio terminal 306 in the simultaneous calling area 307 exists.

Figure 1:
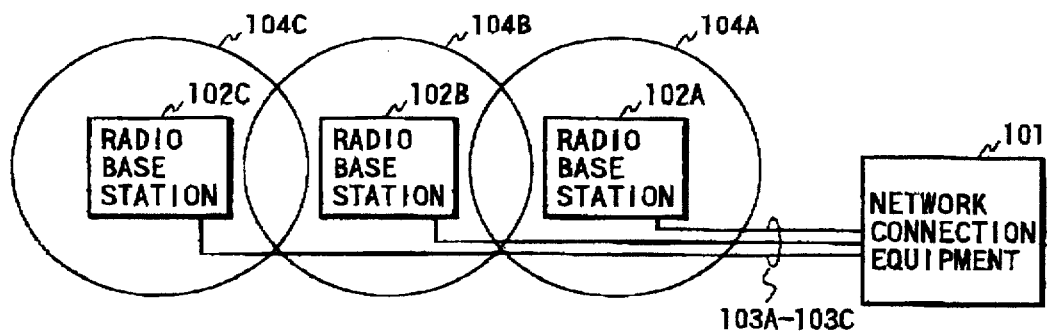
FIG. 1 shows a conventional system configuration diagram.

In the conventional system shown in FIG. 1, a communication line is provided for each radio zone, but in the present invention, the communication lines are relayed for a plurality of radio base stations, that is, for a plurality of radio zones. Moreover, in the conventional system shown in FIG. 1, the communication line must be switched together with the radio link when the hand-over occurs. However, according to the present invention, it is no longer necessary to change over the switch in the network connecting apparatus. Therefore, the network connecting apparatus is not required to take part in the hand-over. Moreover, if radio interference is not generated, it is also possible to select again the same radio channel. The radio channels assigned in each radio base station are concentratedly administered by the network connecting apparatus or autonomously and distributedly administered in each radio base station. Delicate line control is enabled by detecting the operating conditions of the communication lines, radio links and radio base stations depending on respective systems.

Figure 12:
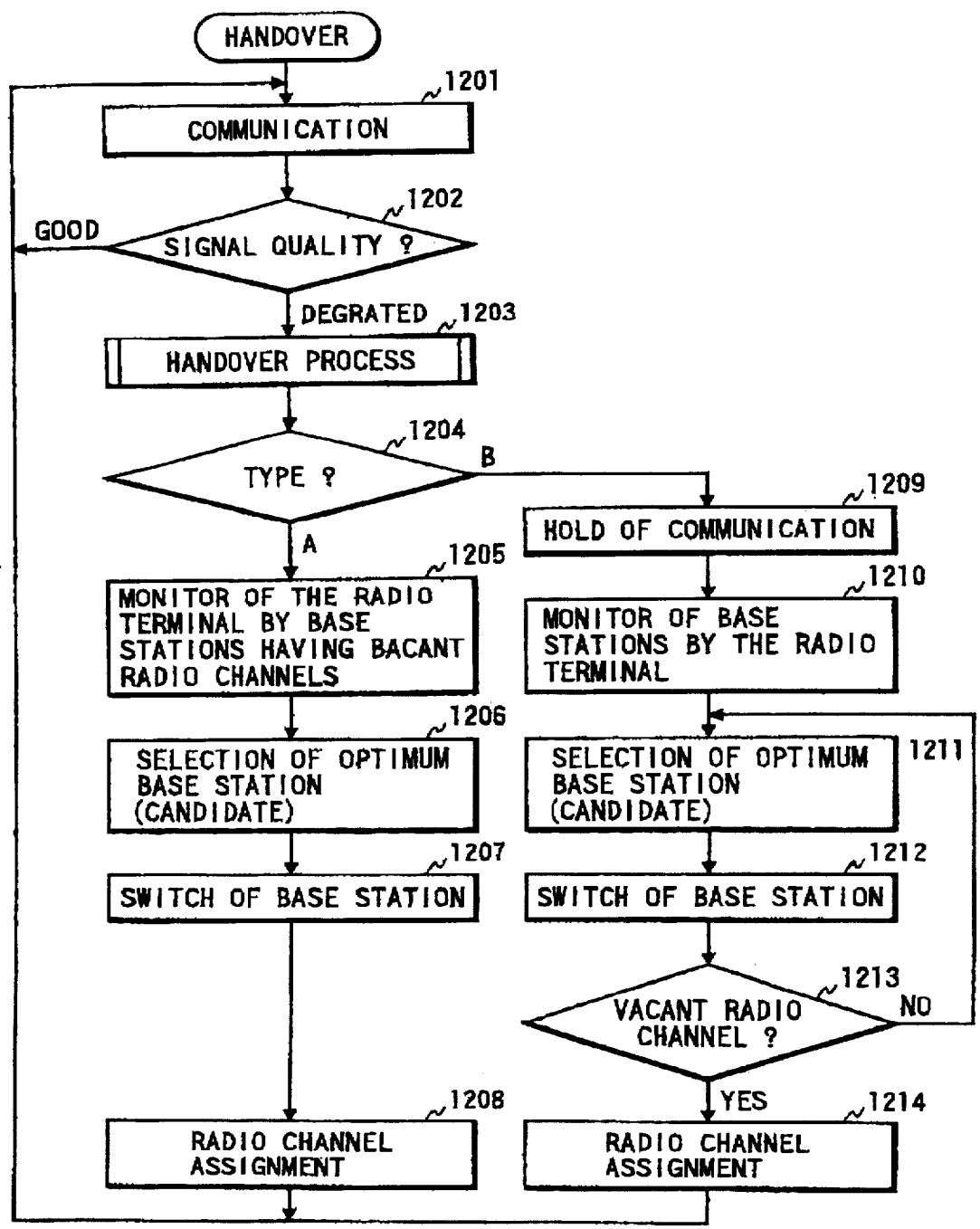
FIG. 12 is a flowchart of hand-over operation based on the present invention.

The hand-over will further be explained with reference to the flowchart shown in FIG. 12. In the embodiment shown in FIG. 3, when any one of the radio base station 302B or radio terminal 306 under the communicating condition (1201) detects drop of communication quality (1202), the hand-over operation (1203) is started. Two types of operations (1204) for overcoming the hand-over are indicated in FIG. 12.

The type A operation is the hand-over operation initiated from the side of the radio base station. When the hand-over processing (1203) is activated, the peripheral radio base stations including the radio base station under the communicating condition having the allowance in the radio links to accept hand-over processing, namely the radio base stations 302A to 302C in this case monitor (1205) the receiving signal from the radio terminal 306. The optimum radio base station for continuing communication with the radio terminal 306, for example, the radio base station 302A is determined (1206) by exchanging information among the radio base stations 302A to 302C or analyzing information in the network connecting apparatus 301. Next, while the communication line from the network connecting apparatus 301 to the radio base stations 302A to 302C, which is substantially used by the radio terminal 306, is fixed, the hand-over operation is completed by switching (1207) only the radio base station and then assigning the new radio channel.

Practical switching (1207) of the radio base station can be realized by several methods. In a first method, a radio base station 302A as the switching destination is informed to the radio terminal 306 from the radio base station 302B under the communication with the radio terminal 306. The radio terminal 306 effects communication with the new radio base station 302A as the switching destination using the control channel and assigns (1208) thereto the new radio channel. In a second method, the radio channel available for the radio base station 302A is determined for the switching (1207) of the radio base station and a new radio channel is assigned (1208) for the radio terminal 306 from the radio base station 302B under the communicating condition. Moreover, in another method for reserving the radio channels, the radio terminal 306 is no longer required to change the radio channel by equalizing the radio channel used by the radio base station 302B and the radio terminal 306 and the radio channel available for the radio base station 302A as the switching destination.

The type B operation is the hand-over operation initiated from the side of the radio terminal. When the hand-over processing (1203) is activated, communication is once held (1209) and the radio terminal 306 monitors (1210) the radio base stations using the control channel. The optimum radio base station, for example, the radio base station 302A is determined (1211) depending on the receiving signal level to request the switching (1212) operation. The radio base station 302A judges (1212) whether there is an idle radio link or not. When there is an idle radio link, a new radio channel is assigned (1214) thereto. If an available radio link is not provided in the radio base station 302A, the radio terminal 306 request the switching operation (1212) to a next prospective radio base station.

In above description, only a single line is laid between the network connecting apparatus and a plurality of radio base stations, but when a plurality of radio links can be coupled in each radio base station, the number of communication lines can be increased up to the maximum value available in the radio base stations.

Figure 4:
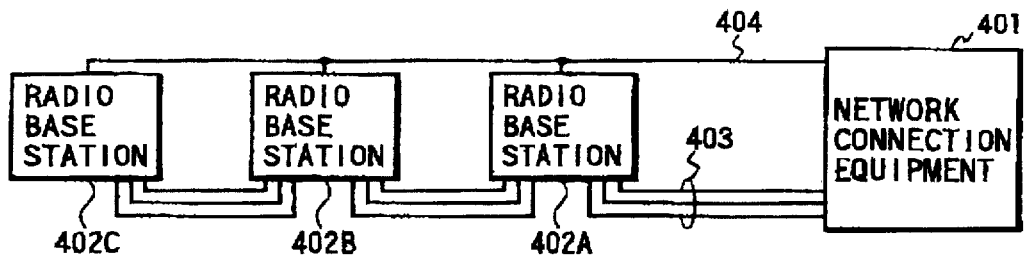
FIG. 4 is a system configuration diagram of a third embodiment of the present invention.

FIG. 4 shows an example of a system configuration as a third embodiment of the present invention. In the system consisting of a network connecting apparatus 401, radio base stations 402A to 402C, communication lines 403 and a control signal line 404, the number of communication lines 403 is set to 3 (three) in this embodiment. In this case, the system is established when three or more communication lines can be connected simultaneously among the radio base stations 402A to 402C. Here, it is also possible to use a part of a plurality of communication lines 403 as the control signal line 404 through small scale modification of the system shown in FIG. 4.

Figure 5:
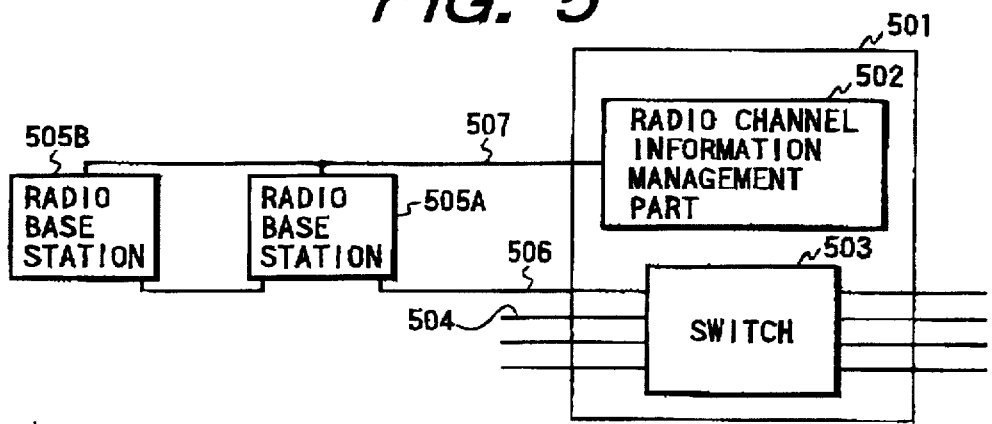
FIG. 5 is a block diagram of a network connecting apparatus.

The administration of the radio channel to be conducted through the control signal line 305 or 404 shown in FIG. 3 and FIG. 4 will be explained. First, an example of configuration for concentrated administration with the network connecting apparatus is shown in FIG. 5. In this figure, a system consisting of a network connecting apparatus 501, radio base stations 505A and 505B, a control signal line 507 and a communication line 506 and a switch 503 and a radio channel information administration section or management part 502 as the function block of the network connecting apparatus 501 associated with the present invention are indicated. Here, the communication line 506 indicates one or more lines as in the embodiment shown in FIG. 4. Moreover, the switch 503 executes an exchange operation of a plurality of communication lines 504 including the communication line 506.

The radio channel information administration section 502 detects the conditions of the radio base station and the radio terminal under the communication condition, communication line and radio channel used for communication, in addition to the position registration processing explained previously. These pieces of information are collected and classified for concentrated administration of the radio base stations 505A and 505B. The radio channels are effectively assigned to the radio base stations 505A and 505B by detecting the application condition of the radio channels in the system. Moreover, the control signal line 507 can also be used for supply of system information. It is preferable for the control signal line 507 to have the configuration to realize the two-wire system or time division bidirectional simultaneous communication. The down-stream signal to the radio base stations 505A and 505B from the network connecting apparatus 501 is mainly used for addressing and can be reasonably formed of combination of various commands having addresses.

Meanwhile, the up-stream signal to the network connecting apparatus 501 from the radio base stations 505A and 505B is mainly formed, for example, by the ALOHA system because the position registration request and traffic of call origination request of the radio terminal changes depending on location and time.

Figure 6:
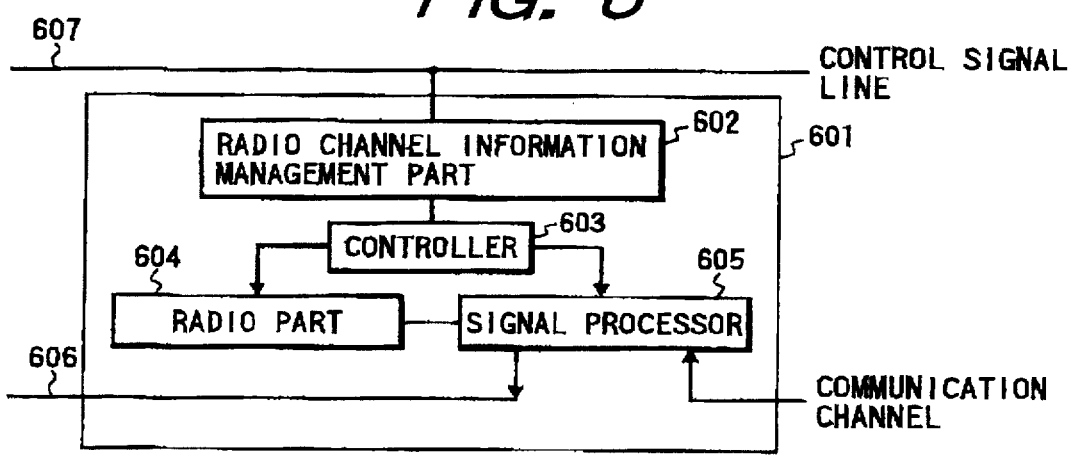
FIG. 6 is a block diagram of a radio base station.

In the concentrated administration system of the network connecting apparatus explained above, when the number of lines to be used increases, a load of the network connecting apparatus becomes heavier. An example of the configuration of the radio base station in such a case as executing the distributed administration in the radio base station which is effective for alleviation of load of the network connecting apparatus is shown in FIG. 6.

The system is composed of a network connecting apparatus not illustrated, a radio base station 601, a control signal line 607 and a communication line 606, and a radio section 604, a signal processing section 605, a control section 603 and a radio channel information administration section 602 are illustrated as the function block of the radio base station 601 in relation to the present invention. The radio channel information administration section 602 detects the conditions of radio base stations in the system. Here, there are various methods where the operating conditions of each radio base station is once classified in the network connecting apparatus and this information is addressed to each radio base station, or each radio base station addresses the information periodically or as required when a call is generated. When a radio base station 601 opens a radio link to effect communication with a radio terminal, the radio channel to be used by the radio base station is determined by the control section 603 from the condition of radio channel used by each radio base station and then it is indicated to the radio section 604. The radio section 604 sets the designated radio channel to open the radio link for the radio terminal. Moreover, the control section 603 performs the control for the signal processing section 605. The signal processing section 605 inputs or outputs the signal to be processed by the communication line 606 which is connected by relaying the other radio base stations from the network connecting apparatus. In the case of effecting communication between a radio terminal and other terminals by way of the radio base station 601, exchange of communication signal with a radio terminal is executed through the radio section 604 from the signal processing section 604 following a command from the control section 603. Meanwhile, for the communication line for which the radio base station 601 does not require exchange of communication signal to the radio terminal, the signal processing section 605 executes only the relaying operation.

An example of an information map to be processed in the radio channel information administration section 502 or 602 is shown in FIGS. 7(a)–7(d) which change with time of contents. As the system condition, the number of communication lines which are extended from the network connecting apparatus and can be relayed by the radio base stations is set to 3, and the number of radio links which can be connected in each radio base station is also set to 3.

FIG. 7(a) assumes the communication between a radio terminal A in the radio zone of the radio base station A and the radio base station A using the radio channel 1 and communication line 1.

FIG. 7(b) assumes origination of a new call from a radio terminal B in the radio zone of the radio base station C wherein the radio channel 1 and communication line 3 are assigned. Here, when the radio base station A and the radio base station C are separated and when the radio terminal A and the radio terminal B are separated with each other generating no radio interference, the same radio channel can be assigned therebetween.

FIG. 7(c) assumes origination of a further new call from the radio terminal C in the radio zone of the radio base station C. In this case, since an idle radio link is left unused for the communication line and radio base station C, connection is possible. Here, since the radio terminal B already uses the radio channel 1 in the same radio zone, the radio channel 2 is assigned to use the communication line 2.

FIG. 7(d) assumes generation of hand-over operation because the radio terminal A and radio terminal B under the communicating condition move to the radio zone of the radio base station B. Here, if it is assumed that the radio terminal B moves quickly in time without any mutual interference to the radio channel 1 used by the radio terminal A during the movement, the radio channel 1 can continuously be used for the communication between the radio base station A and the radio terminal B. At the time of hand-over operation in the radio terminal A which has moved with a certain delay in time from the radio terminal B, the available radio channel is considered. The radio base station B has already used the radio channel 1 with the radio terminal B and the adjacent radio base station C has used the radio channel 2 with the radio terminal C. Therefore, the radio channel 3 which does not generate any radio interference therebetween is assigned.

Figure 8:
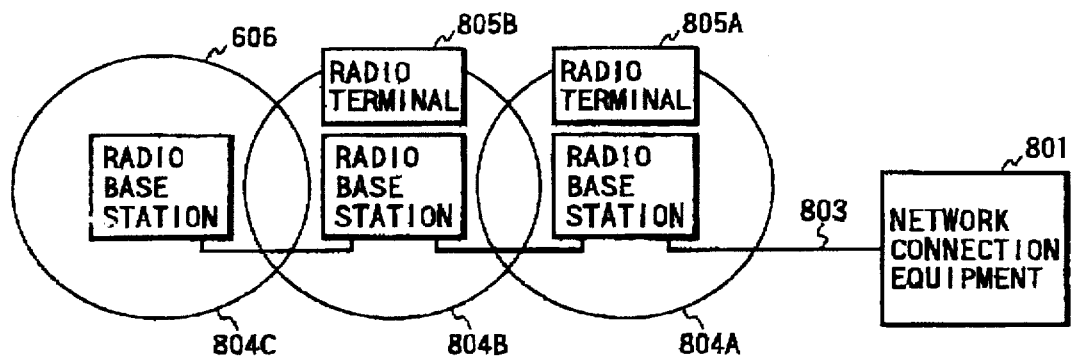
FIG. 8 is a system configuration diagram showing the position registration area and simultaneous calling area in the present invention.

An embodiment for connecting a communication line between the radio base stations not by way of the network connecting apparatus is explained with reference to FIG. 8, which shows a system composed of a network connecting apparatus 801, radio base stations 802A to 802C, a control signal line and a communication line 803 including a plurality of lines. The radio zones as a whole 804A to 804C covered with the radio base stations 802A to 802C are defined as the position registration and simultaneous calling area 806. Regarding the control signal line, the network connecting apparatus 801 is not required to detect in which radio zone the control signal line exists as explained previously, so long as the radio terminals 805A, 805B shown in the figure exist within the simultaneous calling area 806. Here, it is assumed that any one of the radio terminal 805A existing in the radio zone 804A and the radio terminal 805B existing in the radio zone 804B calls the other. In the conventional system, since two units of radio terminals are controlled by a different radio base station, communication is realized using two communication lines through the network connecting apparatus 801.

According to the present invention, one available line is selected from the communication lines 803 used to relay the radio base stations from the network connecting apparatus 801 in order to form a route of radio terminal 805A→radio base station 802A→communication line 803→radio base station 802B→radio terminal 805B, realizing the connection path not including the network connecting apparatus 801. In this case, it is reported to the network connecting apparatus 801 that the radio terminals 805A, 805B are busy using the communication line 803, and it must also be informed to the other radio base stations depending on a system mode.

Each radio base station is not required to have the information of radio terminals in the service area and can obtain such information before establishment of the communication lines by issuing inquiry to the network connecting apparatus 801 or to the database provided separately when a request for origination of call is received from the radio terminal 805A or 805B.

A method for sending and receiving signals between the radio base stations or between a radio base station and network connecting apparatus with the radio channel being used or to be used by the radio base station is explained with the radio channel information administration section 503 in the network connecting apparatus 501 shown in FIG. 5 or the radio channel information administration section 605 in the radio base station shown in FIG. 6 being used. An administrating unit collects information about the radio channel available in each radio base station and automonously judges, when a call is newly originated, to issue a command to the radio base station by determining the radio channel to be used on the basis of the collected information. When the radio channel which is available in the periphery of the radio base station for connection of call or in all radio base stations in the group is selected, change of radio channel for the hand-over operation is no longer required. A combination of such selection of radio channel and fixing of the communication line extended from the network connecting apparatus realizes remarkable reduction in amount of call processings and resultant smooth hand-over operation.

Figure 9:
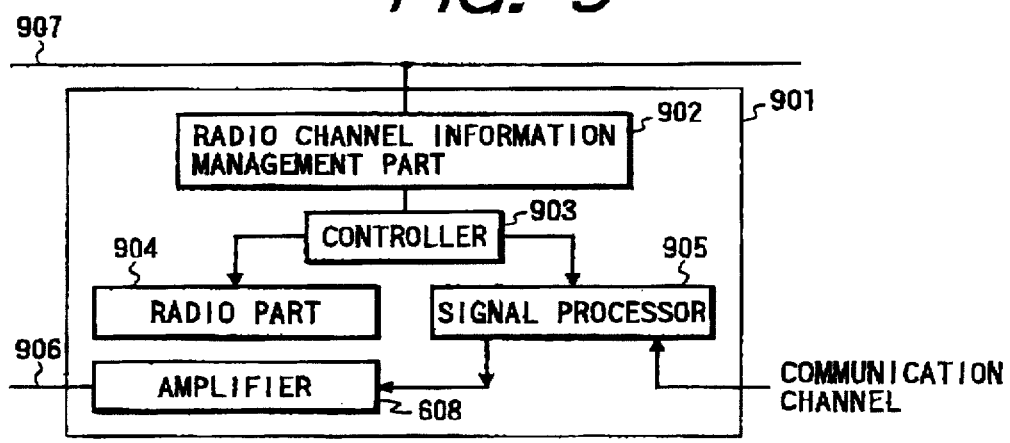
FIG. 9 is a block diagram of a radio base station having relaying and amplifying functions.

Signal transmission distance of the communication lines driven from the network connecting apparatus is generally limited. An example of configuration of a radio base station in the present invention to cope with such limitation is shown in FIG. 9, wherein the radio base station 901 connected to the control signal line 907 and communication line 906 is basically composed of a radio section 904, a signal processing section 905, a control section 903 and a radio channel information administration section 902 as the embodiment shown in FIG. 6. Moreover, the radio base station also comprises an amplifier section 908 for the signal transmitted through the communication line 906. Thereby, the connection distance of communication line can be expanded to also expand the service area.

Figure 10:
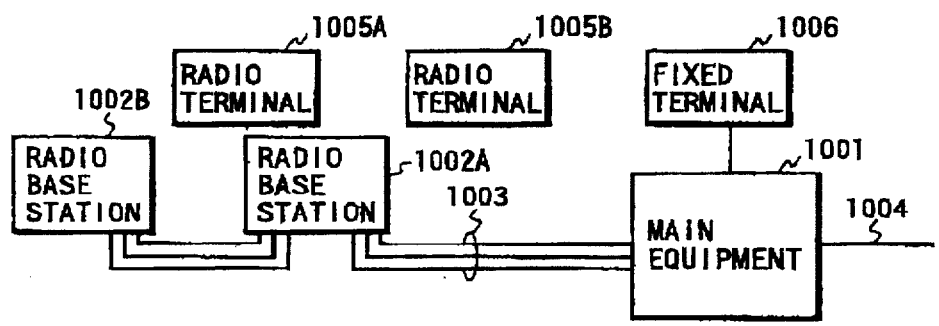
FIG. 10 is a system configuration diagram of a fourth embodiment of the present invention.

In the embodiments described above, the network connecting apparatus corresponds to a public exchange and a private exchange as well as an exchange for mobile communication. Moreover, the present invention can also be applied to a cordless telephone for domestic use or a small scale system cordless telephone. An example of such application is shown in FIG. 10. The main apparatus 1001 corresponding to the network connecting apparatus described above is provided in FIG. 10. The main apparatus 1001 is connected with an office line 1004 and is also extended to a wired terminal 1006 and radio base stations 1002A and 1002B using a domestic communication line 1003. The radio terminals 1005A, 1005B are connected to the main apparatus 1001 through the radio base stations 1002A, 1002B with the radio link. It is also possible to build the radio base station (for example, 1002A) into the main apparatus 1001.

According to the present invention, a wider service area can be obtained with a smaller number of communication lines by connecting the network connecting apparatus to a plurality of radio base stations with the identical communication lines.

Moreover, when the hand-over operation is required in the service area, it can be realized only by changing the radio link while the communication line is fixed and the load of network connecting apparatus can also be alleviated by designating a plurality of radio base stations which are connected with the identical communication line as the position registration area or the simultaneous calling area.

Meanwhile, a radio channel which is available in the periphery of the radio base station for connection of call and in all radio base stations in the group is selected by collecting and administrating information about the radio channels using a communication line or authorized control signal line between the radio base stations and network connecting apparatus or by exchanging the information about the radio channels between the radio base stations to make unnecessary the change of radio channels for the hand-over operation and realize reduction in the amount of call processing of the system as a whole and smooth hand-over operation.

In addition, connection distance of the communication line can be expanded by amplifying, in the radio base stations, the signal transmitted through the communication line connected to a plurality of radio base stations.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A radio communication system which includes a plurality of radio base stations, which are connected to each other in a sequence, comprising:

at least one radio terminal;

a plurality of radio base stations for communicating with said radio terminal via radio;

a network connecting apparatus including means for managing information of radio channels utilized by each of said plurality of radio base stations; and a plurality of wired lines including a plurality of wired communication lines and a plurality of wired control lines, said wired communication lines and said wired control lines connecting said network connecting apparatus and said plurality of radio base stations in sequence so that communication information is relayed in sequence and so that information regarding a radio channel is transmitted among said network connecting apparatus and said plurality of radio base stations;

wherein when said radio terminal requests an assignment of a radio channel to a first radio base station of said plurality of radio base stations, said first radio base station requests an assignment of a radio channel to said means for managing information of said network connecting apparatus via one of said wired control lines; and wherein said means for managing information of radio channels in said network connecting apparatus assigns a vacant radio channel, which is not used by any of said plurality of radio base stations based on information regarding said radio channel utilization as collected from each of said radio base stations through said plurality of wired control lines, and assigns a vacant wired communication line among said plurality of wired communication lines, in accordance with a request from said first radio base station;

wherein said network connecting apparatus holds a first wired communication line of said plurality of wired communication line, when said radio terminal moves from a first communication zone delimited by said first radio base station to a second communication zone delimited by a second radio station, so that said second radio base station communicates with said network connecting apparatus using said first wired communication line; and wherein said means for managing information assigns the same radio channel to said second radio station as assigned for said first radio base station before said radio terminal moves from said first zone to said second zone.

2. A radio communication system according to claim 1, wherein said plurality of wired communication lines and said plurality of wired control lines include at least a first wired communication line connecting said network connecting apparatus and said first radio base station and a second wired communication line connecting said first radio base station and said second radio base station in sequence, and at least a first wired control line connecting said network connecting apparatus and said first radio base station and a second wired control line connecting said first radio base station and said second radio base station, each of said wired communication lines enabling configuration of a plurality of communication channels.

3. A radio communication system which includes a plurality of radio base stations, which are connected to each other in a sequence, comprising:

at least one radio terminal;

a plurality of radio base stations for communicating with said radio terminal via radio;

a network connecting apparatus; and a plurality of wired lines including a plurality of wired communication lines and a plurality of wired control lines, said wired communication lines and said wired control lines connecting said network connecting apparatus and said plurality of radio base stations in sequence so that communication information is relayed in sequence and so that information regarding a radio channel is transmitted among said network connecting apparatus and said plurality of radio base stations;

wherein each of said radio base stations include means for communicating information with other radio base stations, regarding a state of radio channel utilization, collected from each of said radio base station through said plurality of wired control lines;

wherein said radio terminal requests an assignment of a radio channel to a first radio base station of said plurality of radio base stations;

wherein said first radio base station assigns a vacant radio channel as a first radio channel, which is not used by any of said plurality of radio base stations, based on said information regarding said radio channel utilization by collecting from each of said radio base stations through said plurality of wired control lines, and assigns a vacant wired communication line among said plurality of wired communication lines, in accordance with a request from said radio terminal;

wherein said network connecting apparatus holds a first wired communication line of said plurality of wired communication line, when said radio terminal moves from a first communication zone delimited by said first radio base station to a second communication zone delimited by a second radio station, so that said second radio base station communicates with said network connecting apparatus using said first wired communication line; and wherein said first radio station base reports said first radio channel to said second radio base station or said second radio station reports said first radio channel to said first radio base station so that said radio terminal communicates with said second radio base station.

4. A radio communication system according to claim 3, wherein said plurality of wired communication lines and said plurality of wired control lines include at least a first wired communication line connecting said network connecting apparatus and said first radio base station and a second wired communication line connecting said first radio base station and said second radio base station in sequence, and at least a first wired control line connecting said network connecting apparatus and said first radio base station and a second wired control line connecting said first radio base station and said second radio base station, each of said wired communication lines enabling configuration of a plurality of communication channels.

5. A radio communication system which includes a plurality of radio base stations, which are connected to each other in a sequence, comprising:

at least one radio terminal;

a plurality of radio base stations for communicating with said radio terminal via radio;

a network connecting apparatus including means for managing information of radio channels utilized by each of said plurality of radio base stations; and a plurality of wired lines including a plurality of wired communication lines and a plurality of wired control lines, said wired communication lines and said wired control lines connecting said network connecting apparatus and said plurality of radio base stations in sequence so that communication information is relayed in sequence and so that information regarding a radio channel is transmitted among said network connecting apparatus and said plurality of radio base stations;

wherein at least two of said plurality of radio base stations form at least one group thereof, connect said wired communication lines to said network connecting apparatus in sequence and said at least one group is divided into a plurality of subgroups as at least one of a position registration area and a paging area, and each of said radio base stations include means for communicating with other radio base stations information regarding a state of said radio channels utilization as collected from each of said radio base station through at least said wired control lines;

wherein said radio terminal requests an assignment of a radio channel to one of a first radio base station and a second radio base station of said plurality of radio base stations;

wherein said second radio base station assigns a vacant radio channel as a first radio channel, which is not used by any of said at least two radio base stations based on said information regarding said radio channels utilization as collected from each of said radio base stations through said plurality of wired control lines, and assigns a vacant wired communication line among said plurality of wired communication lines in accordance with request from said radio terminal; and said radio terminal initially establishes communication with a calling subscriber terminal through said first radio base station using the first radio channel assigned by said second radio base station.

6. A radio communication system according to claim 5, wherein said plurality of wired communication lines and said plurality of wired control lines include at least a first wired communication line connecting said network connecting apparatus and said first radio base station and a second wired communication line connecting said first radio base station and said second radio base station in sequence, and at least a first wired control line connecting said network connecting apparatus and said first radio base station and a second wired control line connecting said first radio base station and said second radio base station, each of said wired communication lines enabling configuration of a plurality of communication channels.

7. A radio communication system according to claim 5, wherein a first wired communication line is connected between said first radio base station which communicates with a first radio terminal and said second radio base station which communicates with a second radio terminal, said first radio terminal which is calling a radio terminal and said second radio terminal which is calling a radio terminal communicate directly with each other without using said network connecting apparatus when said first and said second radio terminals are in the same position registration area and in a simultaneous calling area;

wherein said first radio base station and said second radio base station which are in communication with said first radio terminal select one of the plurality of wired communication lines when said first radio terminal and second radio terminal are within one of the same position registration area and paging area.

8. A radio communication system according to claim 7, wherein said plurality of wired communication lines and said plurality of wired control lines include at least a first wired communication line connecting said network connecting apparatus and said first radio base station and a second wired communication line connecting said first radio base station and said second radio base station in sequence, and at least a first wired control line connecting said network connecting apparatus and said first radio base station and a second wired control line connecting said first radio base station and said second radio base station, each of said wired communication lines enabling configuration of a plurality of communication channels.

9. A radio communication system according to claim 7, wherein said plurality of radio base stations which connect a calling radio terminal report occupation of a first wired communication line to at least one of said network connecting apparatus and other radio base stations in the same position registration area and the simultaneous paging area, wherein a radio terminal which has moved from a first communication zone delimited by said first radio base station to a second communication zone delimited by said second radio base station establishes communication through a third radio base station, when said calling or called radio terminal under communication with each other moves to a third communication zone delimited by said third radio base station, wherein said wired communication line in use is held so that said third radio base station communicates with said first radio base station or said second radio base station using the same wired communication line, wherein said network connecting apparatus or said radio base station which assigned the radio channel for at least one of said calling and called radio terminal which is moved reports said radio channel assigned to said third radio base station or said third radio base station requests said radio base station which assigned said radio channel for at least one of said calling and called radio terminal which is moved for establishing communication between said first radio terminal and said third radio base station with change so that said first radio terminal communicates with said third radio base station using the same radio channel as assigned in said first radio base station or said second radio base station.

10. A radio communication system according to claim 9, wherein said plurality of wired communication lines and said plurality of wired control lines include at least a first wired communication line connecting said network connecting apparatus and said first radio base station and a second wired communication line connecting said first radio base station and said second radio base station in sequence, and at least a first wired control line connecting said network connecting apparatus and said first radio base station and a second wired control line connecting said first radio base station and said second radio base station, each of said wired communication lines enabling configuration of a plurality of communication channels.

* * * * *